United States Patent [19]

Stange

[11] 4,130,274
[45] Dec. 19, 1978

[54] PNEUMATIC REGISTRATION APPARATUS
[75] Inventor: Klaus K. Stange, Pittsford, N.Y.
[73] Assignee: Xerox Corporation, Stamford, Conn.
[21] Appl. No.: 775,508
[22] Filed: Mar. 8, 1977

Related U.S. Application Data

[63] Continuation of Ser. No. 627,571, Oct. 31, 1975, abandoned.

[51] Int. Cl.² .............................................. B65H 9/00
[52] U.S. Cl. ..................................... 271/236; 271/195
[58] Field of Search ............... 271/194, 195, 211, 226, 271/234, 236, 250, 251, 264

[56] References Cited

U.S. PATENT DOCUMENTS

| | | | |
|---|---|---|---|
| 1,107,859 | 8/1914 | Stevens | 271/211 |
| 3,405,977 | 10/1968 | Albright | 271/195 |
| 3,624,807 | 11/1971 | Schwebel | 271/236 |
| 3,784,189 | 1/1974 | Thiel | 271/264 |
| 3,918,706 | 11/1975 | Craft | 271/250 |

Primary Examiner—Evon C. Blunk

[57] ABSTRACT

In a first embodiment a stop having a plurality of ports is connected to and covers an end of a rectangular sleeve. In a region near the stop a narrow wall of the sleeve also has a plurality of ports. A nozzle coupled to a pump provides a flow of air into the other end of the sleeve and the air exits through the ports. With this arrangement, a rectangular sheet inserted into said other end of the sleeve is fluidly brought into registration with the narrow wall and stop. In a second embodiment, similar to the first, the narrow wall and stop include internal projections against which an inserted sheet is registered. In a third embodiment, similar to the first, a manifold is coupled to the ports and a vacuum pump is coupled to the manifold to accelerate registration. In a fourth embodiment, similar to the third, the pumps are replaced with a reversible pump to register and discharge a sheet.

1 Claim, 7 Drawing Figures

PNEUMATIC REGISTRATION APPARATUS

This is a continuation of application Ser. No. 627,571, filed on Oct. 31, 1975 and subsequently abandoned.

The subject invention generally relates to pneumatic transports and in particular, to transports used to register articles carried thereby.

The use of fluid to move articles into registration with stops is known. In fact, such use of fluids is disclosed in U.S. Pat. No. 3,588,096, issued to Leigh D. Leiter on June 28, 1971. More particularly, the patent discloses apparatus wherein fabric is delivered to a horizontally disposed support including recessed areas housing upwardly pointed nozzles. The nozzles are aligned in two different directions, and the nozzles pointing in one direction are alternately actuated with respect to the nozzles pointing in the other direction to move the fabric into registration in perpendicular directions. Further, the use of fluids for rectilinearly moving an article within a conduit or chamber is also known. In fact, this concept is disclosed in U.S. Pat. No. 3,422,411, issued to J. E. Smith, Jr., on Jan. 14, 1969. More specifically, this patent discloses a data storage cartridge which has an enclosed transfer chamber housing a data storage card. Air pressure and vacuum pressure are switched between opposite ends of the chamber to reciprocally move the card rectilinearly in the chamber.

It is noted that with the apparatus disclosed by Leigh D. Leiter as fabric is advanced, or when fabric which is smaller than the distance between nozzles is to be registered, some of the nozzles discharge into the surrounding air without having any effect on the fabric as it is moved into registration. In addition, it is noted that in the system disclosed by J. E. Smith, Jr., lateral registration is provided by the distance between walls of the chamber which are parrallel to the direction of travel of the storage card. Thus, the system cannot be used with cards having different width dimensions.

It is an object of the present invention to provide apparatus for registering a sheet with respect to perpendicularly related axes, the sheet having any one of a range of sizes.

It is another object of the present invention to provide apparatus for efficiently moving a sheet into registration with perpendicularly related axes.

Briefly, the invention disclosed herein may be used for registering a sheet with respect to perpendicularly related axes, so long as the sheet has length and width dimensions within predetermined ranges. Structurally, the invention may be implemented with (a) a sleeve for internally accommodating said sheet, at least one point on an inner narrow wall of the sleeve being aligned in parallel with one of the axes; (b) a stop located at one end of the sleeve, the stop having at least one point aligned in parallel with the other of the axes; and (c) means for providing in the sleeve a fluid stream having velocity components normal to each of the axes, whereby when a sheet is placed in the sleeve, the stream moves the sheet into abutment with each of said points.

Apparatus built according to the invention may be used to register flimsy sheets, such as thin paper. Further, since sheets are not mechanically gripped and moved into registration, the sheets are not charged electrostatically, and indicia on the sheets is not rubbed off. Advantageously, loose particles undesirably located on either side of the sheets are removed from the sheets during transportation.

Additional objects and features of the invention will become apparent by reference to the following description in conjunction with the accompanying drawings, in which.

Figure 1:
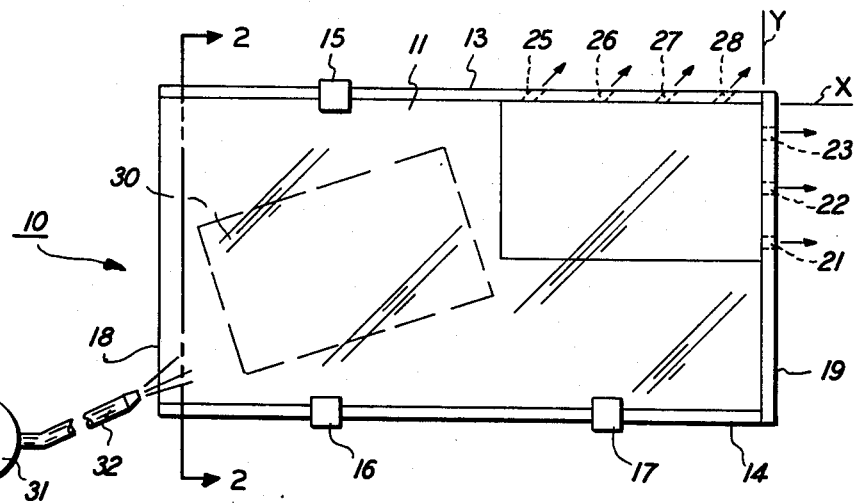
FIG. 1 is a top plan view of registration apparatus, according to the invention, a sheet being shown therein in an unregistered position (dotted lines) and in a registered position.
Figure 2:
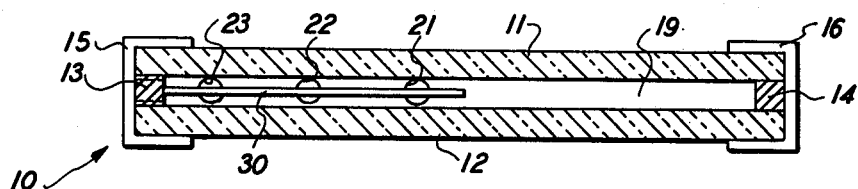
FIG. 2 is a cross-sectional view of the registration apparatus, taken along line 2—2 of FIG. 1.

Registration apparatus 10, according to the invention, is shown in FIGS. 1 and 2. Typically, the apparatus includes a pair of structurally identical rectangular plates 11 and 12, a pair of elongated rectangular members 13 and 14 disposed between the plates along longitudinally extending edges, and clamps 15–17 for holding the plates and elongated members together to form a rectangular sleeve. The plates are vertically aligned, and the elongated members are coterminous with the plates at one end 18 and at the other end provide a pair of recesses into which a stop 19 is inserted and secured. The stop 19 includes a plurality of ports 21–23 communicating with the space in the sleeve. Elongated member 13 also includes a plurality of ports 25–28 communicating with the space in the sleeve, the ports in the stop and sleeve being located adjacent a common corner. The plates, the elongated members, and the stop are assembled in a fluid tight manner, such that fluid entering through the open end of the sleeve moves towards the common corner and exits through the ports. The stop is perpendicularly disposed with regard to the elongated members and, therefore, the common corner may be aligned with X and Y axes. The top and bottom plates are spaced from each other by approximately one-sixteenth of an inch, and a sheet of paper 30 which is smaller than the length and width of the space in the sleeve may be inserted therein as is indicated by the dotted lines. If, thereafter, a pump 31 and nozzle 32 direct fluid into the open end of the sleeve, the fluid flow through the sleeve will float the sheet into registration at the common corner. To move the sheet out of registration, the horizontally disposed sleeve may be tilted or a fluid stream may be injected into the sleeve through one or more of the ports in the stop. In this embodiment, the top and bottom plates are manufactured from glass. Thus, sheets brought into registration may be read or may be photographed with stationary equipment.

The registration apparatus disclosed above may be modified or supplemented in a number of ways, some of which are set forth below. In describing the various embodiments similar reference numerals will be used to designate components previously described.

Figure 3:
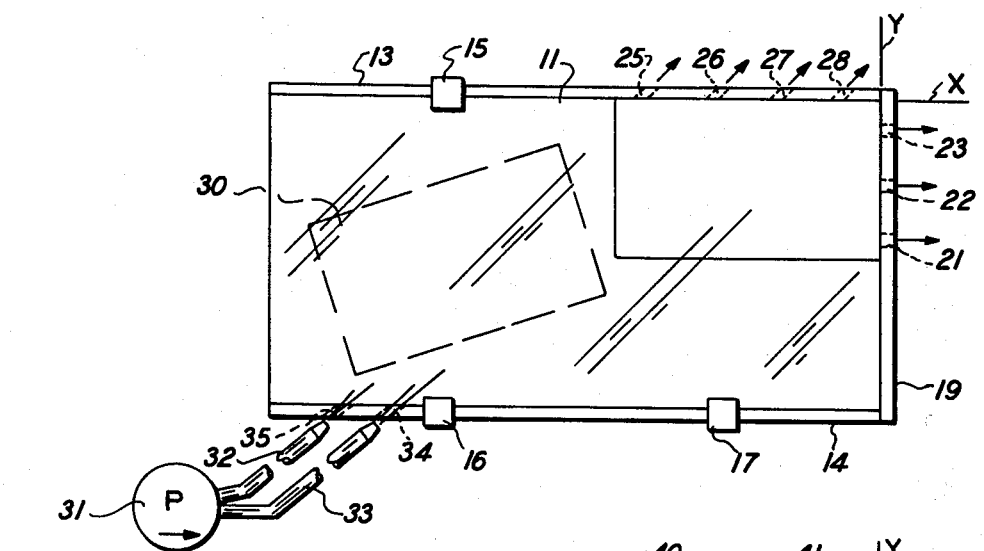
FIG. 3 is a top-plan view of another embodiment of registration apparatus, according to the invention, a sheet being shown therein in an unregistered position (dotted line) and in a registered position.

Referring to FIGS. 1 and 3, it may be seen that the registration apparatus shown in FIG. 3 differs from that shown in FIG. 1 only in that ports 34 and 35 communicating with the sleeve are located on the elongated member 14 in an area adjacent the open end of the sleeve and that an additional nozzle 33 has been coupled to the pump. The nozzles are used to inject fluid through the ports in the elongated member for moving a sheet 30 inserted into the sleeve into a registered position. Although not shown, it will be appreciated by those skilled in the art that the nozzles may be replaced by a manifold coupling the pump to ports in elongated member 14. Further, a removable cover for closing the open end 18 after a sheet has been inserted may be provided to increase the speed with which a sheet is moved into registration. Primarily, this embodiment has been disclosed to make it clear that fluid for registering a sheet located in the sleeve need not be supplied through the open end of the sleeve.

Figure 4:
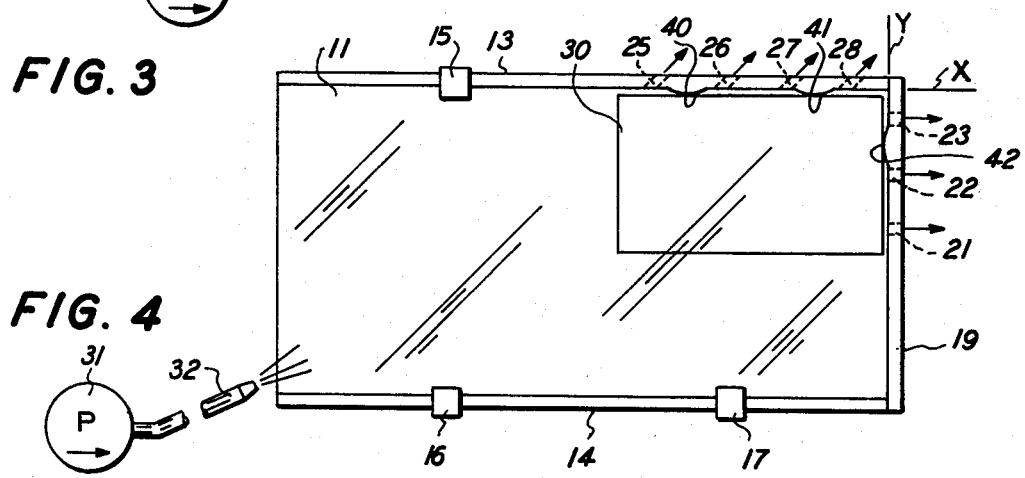
FIG. 4 is a top-plan view of still another embodiment of registration apparatus, according to the invention, a sheet being shown therein in a registered position.

Referring to FIGS. 1 and 4, it may be seen that the registration apparatus shown in FIG. 4 differs from that shown in FIG. 1 only in that elongated member 13 includes projections 40 and 41 tangentially aligned with an X axis, and the stop member includes a projection 42 tangentially aligned with a Y axis. These projections minimize the need for precise orthogonal alignment between the stop 19 and the elongated member 13 required to register a rectangular sheet. Alternatively, the projections improve registration when minor irregularities are present in sheets supplied for registration.

Figure 5:
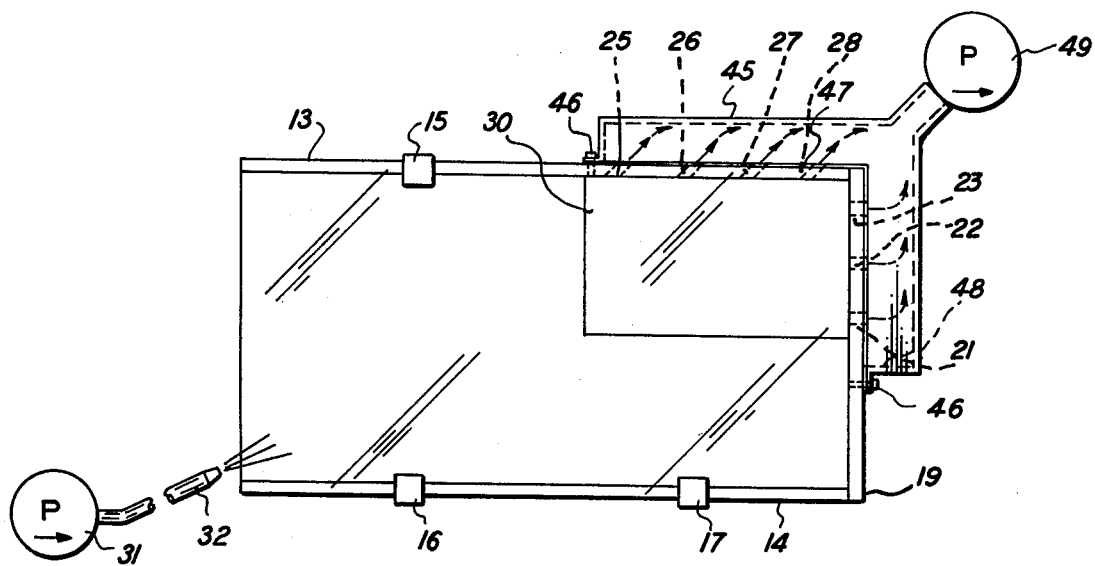
FIG. 5 is a top-plan view of still another embodiment of registration apparatus, according to the invention, a sheet being shown therein in a registered position.
Figure 6:
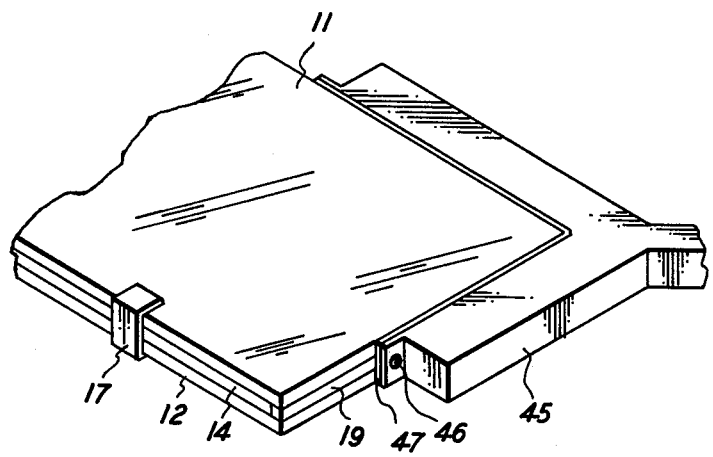
FIG. 6 is a partial perspective view of the registration apparatus shown in FIG. 5.

Referring to FIGS. 1, 5, and 6, it may be seen that the registration apparatus disclosed in FIGS. 5 and 6 differs from that shown in FIG. 1 in that a manifold 45 is fastened with screws 46 to the elongated member 13 and stop 19. A gasket 47 is interposed between the manifold 45 and the sleeve to prevent fluid leakage. The ports 25-28 in the elongated member and ports 21-23 in the stop communicate with a chamber 48 in the manifold, and the chamber in the manifold communicates with a vacuum pump 49. With this arrangement the flow of fluid through the sleeve may be accelerated to more rapidly register sheets inserted through the open end of the sleeve. If desired, the pump 31 and nozzle 32 may be dispensed with and the sheet 30 may be registered with the vacuum pump 49. Thus, it may be seen that sheet 30 may be registered with a pressure pump, with a vacuum pump or with both. In a laboratory experiment apparatus such as shown in FIG. 5 was assembled, the chamber defined by the sleeve and stop having dimensions of 9 × 15 × 0.75 inches. With an 8.5 × 14 inch 20 lb. sheet of paper inserted almost entirely in the chamber negative pressures of 1 and 4 inches of water at the manifold exerted forces of 4 and 12 grams, respectively, on the sheet.

Figure 7:
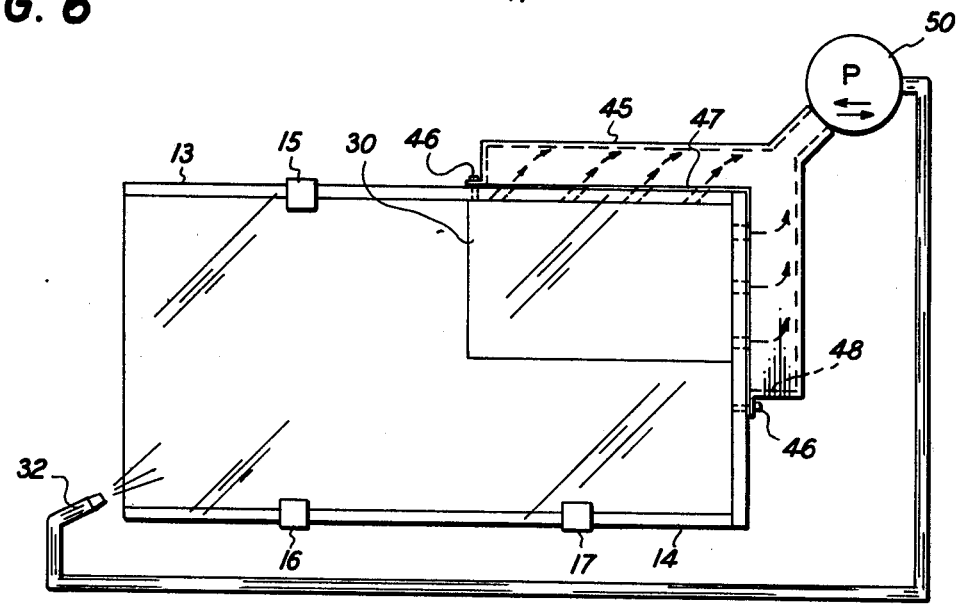
FIG. 7 is a top-plan view of yet another embodiment of registration apparatus, according to the invention, a sheet being shown therein in a registered position.

Referring to FIGS. 5 and 7, it may be seen that FIG. 7 shows apparatus which differs from that which is shown in FIG. 5 only in that the pumps 31 and 49 have been replaced with a reversible pump 50 coupled to the nozzle 32 and manifold 45. The reversible pump may be used to rapidly move a sheet inserted into the sleeve into registration and to rapidly move a registered sheet out through the open end of the sleeve. In this connection, it should be appreciated that the term reversible pump may include apparatus having a valve arrangement which may be operated manually or automatically.

It is to be understood that the description herein of preferred embodiments, according to the invention, have been set forth as examples thereof and are not to be construed or interpreted as limitations on the claims which follow and define the invention.

What is claimed is:

1. Apparatus for registering a sheet with respect to perpendicularly related axes, the sheet having a length and width within predetermined ranges, comprising:
    (a) a sleeve for internally accommodating said sheet, having a top plate and a bottom plate, at least a section of one of the plates being transparent to provide a substantial view of a registered sheet, and at least one point on an inner narrow wall of the sleeve being coincident with one of the axes;
    (b) a stop located at one end of the sleeve, the stop having at least one point coincident with the other of the axes; and
    (c) means, remote from said transparent section, for providing in the sleeve a fluid stream having velocity components normal to each of the axes, whereby when a sheet is placed in the sleeve the stream moves the sheet into abutment with each of said points, wherein said means for providing a fluid stream includes at least one port in said stop and at least one port in said narrow wall, and wherein said means for providing a fluid stream includes a manifold coupled to at least one of the ports and a pump for discharging fluid from the manifold.

* * * * *